March 26, 1940.　　　E. G. GARTIN　　　2,195,203
PRESSURE FLUID MOTOR
Filed Jan. 25, 1934　　　3 Sheets-Sheet 2
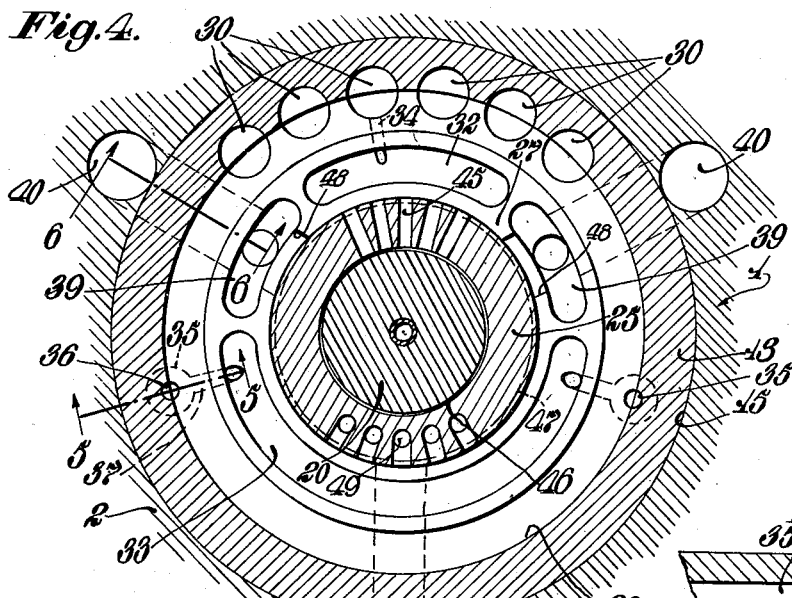
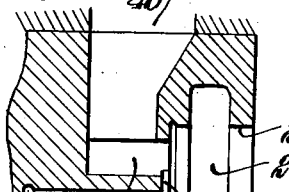
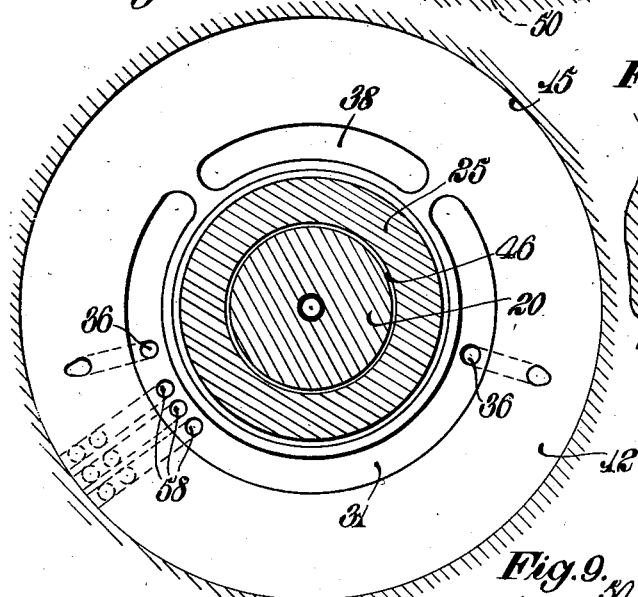
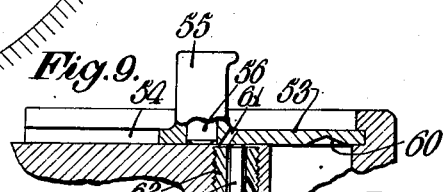
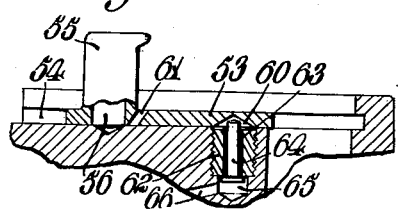
Inventor:
Elmer G. Gartin.
by Louis A. Matson
Atty.

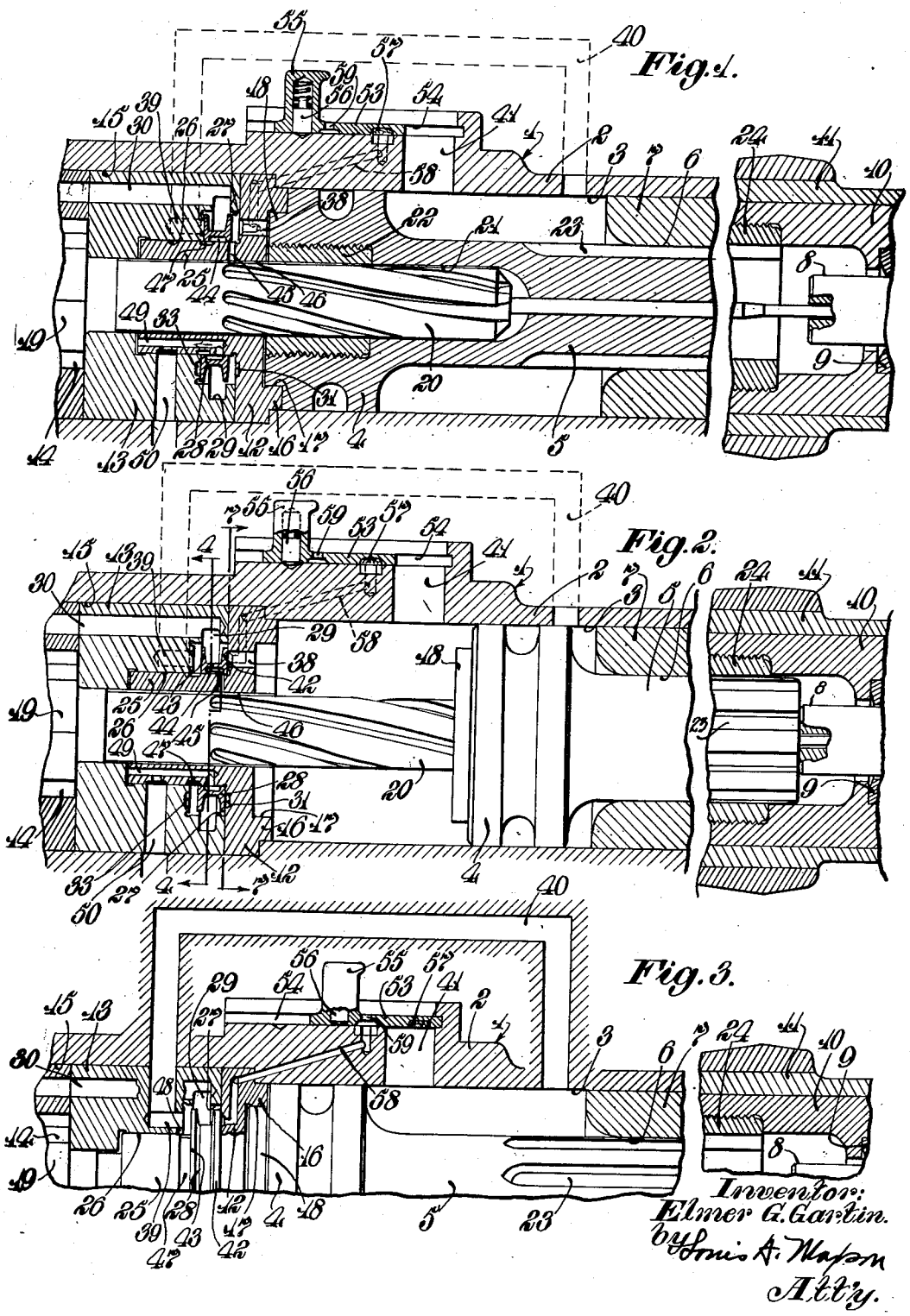

March 26, 1940.  E. G. GARTIN  2,195,203
PRESSURE FLUID MOTOR
Filed Jan. 25, 1934  3 Sheets-Sheet 3
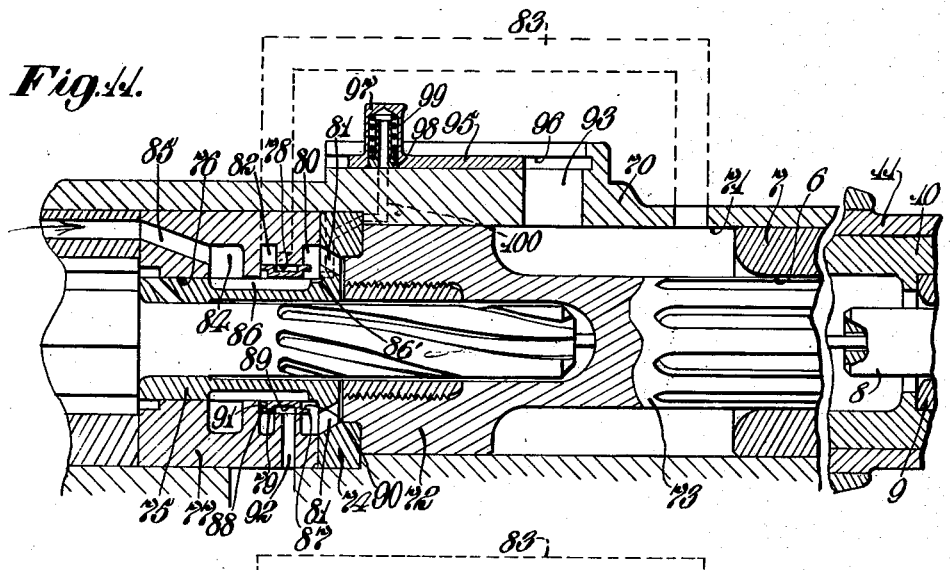
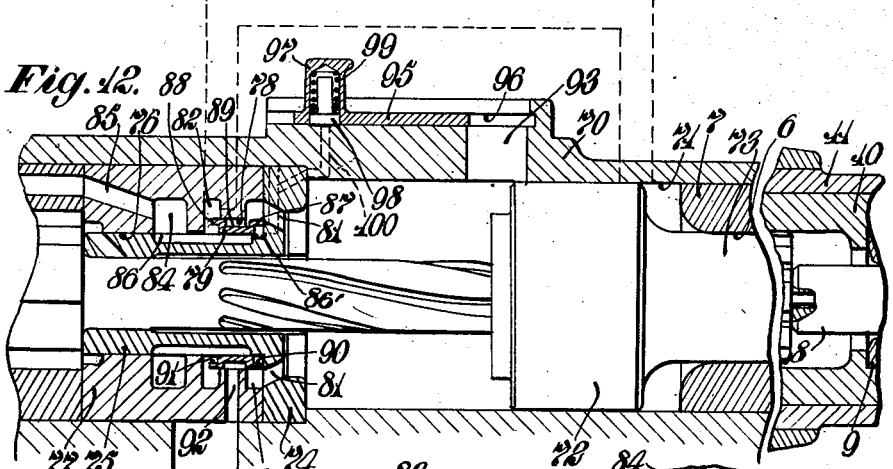
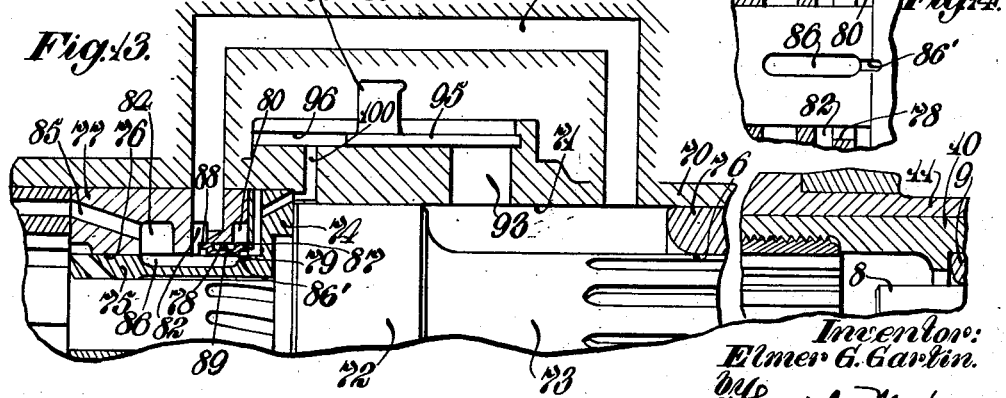
Inventor:
Elmer G. Gartin Patented Mar. 26, 1940

2,195,203

UNITED STATES PATENT OFFICE 2,195,203

PRESSURE FLUID MOTOR

Elmer G. Gartin, Claremont, N. H., assignor to Sullivan Machinery Company, a corporation of Massachusetts Application January 25, 1934, Serial No. 708,269

2 Claims. (Cl. 121—24)

This invention relates to pressure fluid motors, and more particularly, but not exclusively, relates to pressure fluid motors especially designed for use in hammer type rock drills.

An object of this invention is to provide an improved pressure fluid motor. Another object is to provide an improved valve mechanism and fluid distribution means for such a motor. A further object of this invention is to provide an improved pressure fluid motor especially designed to use in rock drills. These and other objects will, however, hereinafter more fully appear.

In the accompanying drawings there are shown for purposes of illustration two forms and two modifications which the invention may assume in practice.

In these drawings—

Fig. 1 is a central, longitudinally extending, vertical sectional view taken through one illustrative form of the improved pressure fluid motor.

Fig. 2 is a view similar to Fig. 1 showing the fluid distributing valve and hammer piston in a different position.

Fig. 3 is a fragmentary view similar to Figs. 1 and 2 showing the parts in a hole blowing position.

Fig. 4 is an enlarged cross sectional view taken on line 4—4 of Fig. 2, with the valve omitted.

Fig. 5 is a detail sectional view taken on line 5—5 of Fig. 4.

Fig. 6 is a detail sectional view taken on line 6—6 of Fig. 4.

Fig. 7 is an enlarged cross sectional view taken on line 7—7 of Fig. 2.

Figs. 8 and 9 are detail sectional views showing a modified form of hole blowing control means.

Fig. 10 is a detail view showing a modified form of valve construction.

Fig. 11 is a view similar to Fig. 1 showing another illustrative form of the invention.

Fig. 12 is a view similar to Fig. 11 showing the fluid distributing valve and hammer piston in a different position.

Fig. 13 is a fragmentary view similar to Figs. 11 and 12 showing the parts in a hole blowing position.

Fig. 14 is a detail view showing a portion of the improved fluid distribution means shown in Fig. 11.

In the illustrative embodiment of the invention shown in Figs. 1 to 7, inclusive, there is shown a pressure fluid motor generally designated 1 particularly designed to use in rock drills of the hammer type and comprising a cylinder 2 having a bore 3 containing a reciprocable hammer piston 4. The hammer piston is provided with a forwardly projecting striking bar 5 guided in a bore 6 formed in the front motor head 7, and this striking bar is adapted to deliver a series of impact blows to the shank 8 of a usual hollow rock drill steel. The drill steel shank is loosely supported in a chuck bushing 9 carried by a chuck sleeve 10 rotatably mounted in a front chuck housing 11 suitably secured to the front end of the motor cylinder. Arranged at the rear end of the cylinder is a rear head plate 12, a cylindrical valve chest member 13 and a ratchet and pawl mechanism 14, the elements 12, 13 and 14 being arranged in an axial bore 15 formed in the motor cylinder and held therein in any suitable manner. The rear head plate 12 is provided with an annular flange 16 fitting the rear end of the cylinder bore and having a central recess 17 for receiving a circular projection 18 formed on the rear face of the piston head. The rotatable pawl carrier 19 of the ratchet and pawl mechanism 14 has secured thereto a forwardly projecting, spirally grooved rifle bar 20 extending axially through bores formed in the elements 12 and 13 and within a bore 21 formed in the hammer piston and interlocked with the hammer piston by engagement with a rifle nut 22 secured within the piston head. Formed on the striking bar 5 of the hammer piston are longitudinally extending flutes or grooves 23 engaging straight keys or vanes formed on a chuck nut 24 fixed to the rotatable chuck sleeve 10. As is usual in rock drills of the hammer type, the ratchet and pawl mechanism and rifle bar cause the hammer piston to have a rotary motion during the retraction stroke thereof, and this rotary motion is transmitted through the grooves on the striking bar, the chuck nut, chuck sleeve and the chuck bushing 9 to the rock drill steel, and as a result the drill steel is intermittently rotated as it is percussively actuated by the hammer piston.

Now referring to the improved fluid distribution means and more particularly to the improved valve mechanism, it will be noted that formed integral with the rear head plate 12 is a rearwardly projecting sleeve portion 25 fitting a bore 26 formed in the valve chest member 13. Encircling this sleeve portion 25 at the rear face of the head plate 12 is an annular chamber 27 having reciprocably mounted therein and guided on the sleeve portion 25 the improved fluid distributing valve 28. Formed centrally in the bore 27 of the valve chamber is an internal annular groove 29 connected by a series of longitudinally extending passages 30 with a source of pressure fluid supply. As shown in Fig. 7, formed in the rear face of the head plate 12 and communicating with the valve chamber at the forward side of the valve is an elongated arcuate groove 31, while formed in the valve chest member 13 and communicating with the valve chamber at the rear side of the valve are arcuate grooves 32 and 33 of a combined volumetric capacity substantially equal to the volumetric capacity of the groove 31. Pressure fluid is supplied constantly to the groove 32 through a passage 34 (see Fig. 4) communicating with one of the fluid supply passages 30, while pressure fluid is constantly supplied to the grooves 31, 33 through longitudinally extending passages 35, 35 communicating with the source of pressure fluid supply and passages 36 and 37 connecting the grooves 31 and 33, respectively, with the passage 35, as shown in Fig. 5. Formed in the head plate 12 is an arcuate passage 38 connecting the forward end of the valve chamber 27 with the recess 17 communicating with the rear end of the cylinder bore. Formed in the valve chest member 13 between the grooves 32, 33 is a pair of arcuate recesses 39, 39 communicating with the rear end of the valve chamber 27 and connected by passages 40, 40 with the forward end of the cylinder bore. The motor cylinder is provided with a central piston-controlled exhaust passage 41.

Now referring to the improved fluid distributing valve per se, it will be noted that this valve is of generally U-shape in cross section and is in the form of a flanged sleeve slidably guided on the sleeve portion 25 of the rear head plate. The form and rear flanges 42 and 43 of this valve are of slightly less diameter than the bore forming the valve chamber 27, there being provided a slight clearance between the external periphery of the valve and the valve chamber bore to admit pressure fluid past the valve flanges. Formed internally within the valve is an annular exhaust groove 44, while formed in the sleeve portion 25 of the rear head plate and communicating with the valve chamber adjacent the forward end thereof are radial passages 45 communicating with the rear end of the cylinder bore through the bore 46 of the sleeve portion 25. Formed on the exterior of the sleeve portion 25 is an annular groove 47 communicable through passages 48 (see Fig. 3) with the arcuate recesses 39, 39. The internal groove 44 in the valve is connected to exhaust through passages 49 formed in the sleeve portion 25 and communicating with a radial exhaust passage 50. In the modified form of distributing valve shown in Fig. 10, instead of providing a clearance between the external peripheries of the valve flanges 42, 43, these flanges have a sliding fit at 51 with the bore of the valve chamber 27, and there are formed in the exterior periphery of the valve flanges notches or grooves 52 to admit pressure fluid past the valve flanges.

The operation of the improved pressure fluid motor will be clearly apparent from the description given. Assuming that the parts are in the position shown in Fig. 1 and the distributing valve 28 is held in its rearmost position against the rear wall of the valve chamber, pressure fluid flows from the supply passages 30 through the annular groove 29, through the valve chamber past the exterior periphery of the forward valve flange 42 and thence through the passage 38 to the rear end of the cylinder bore to act on the rear pressure area of the piston, and as a result the hammer piston is moved forwardly to effect its working stroke, the striking bar delivering an impact blow to the drill steel shank. Upon forward movement of the hammer piston, the front end of the cylinder bore is connected to atmosphere through the exhaust passage 41, while the passages 40, 40 and arcuate recesses 39, 39 are connected to atmosphere through the passages 48, groove 47, internal groove 44 in the valve and passages 49, 50. Communication of the arcuate recesses 39, 39 with the annular fluid supply groove 29 is cut off by the rear flange 43 of the valve seating against the rear end wall of the valve chamber. As the rear edge of the piston head overruns the exhaust passage 41, the pressure within the rear end of the cylinder bore is suddenly materially dropped, due to the communication thereof with the exhaust and the restricted flow clearance about the exterior periphery of the front valve flange 42 past which pressure fluid flows to the rear end of the cylinder. As a result, there is a drop in pressure at the forward face of the valve and the pressure fluid flowing through the passages 34 and 37 to the constant pressure grooves 32 and 33 acts on the rear face of the rear valve flange 43 to throw the valve, against the opposing reduced pressure, from the position shown in Fig. 1 to the position shown in Fig. 2. When the fluid distributing valve is in the position shown in Fig. 2, the forward face of the front flange 42 of the valve cuts off communication of the passage 38 with the fluid supply groove 29 by its seating engagement with the front end wall of the valve chamber, while pressure fluid is supplied to the front end of the cylinder bore through the passages 30, annular groove 29, past the restricted flow space about the exterior periphery of the valve flange 43, through the valve chamber and through recesses 39 and passages 40 to the front end of the cylinder bore. The rear end of the cylinder bore is connected to exhaust through the central exhaust passage 41 and through bore 46, passages 45, internal groove 44 in the valve and passages 49 and 50 communicating with the atmosphere. The pressure fluid flowing to the forward end of the cylinder bore acts on the front pressure area of the piston, moving the latter rearwardly to effect its retraction stroke, and as the front edge of the piston head overruns the exhaust passage 41, the pressure within the front end of the cylinder bore, passages 40 and recesses 39, 39 suddenly drops, due to the restricted flow of fluid past the valve flange 43, and the pressure in the constant pressure groove 31 acting on the front pressure area of the valve throws the valve rearwardly against the opposing reduced pressure from the position shown in Fig. 2 to the position shown in Fig. 1. The operations above described are rapidly repeated during normal operation of the motor to effect rapid reciprocation of the hammer piston.

The improved means shown in Figs. 1, 2 and 3 for effecting a hole blowing function, that is to blow away the cuttings from the drill steel, herein comprises a slide valve 53 mounted in a guideway 54 formed on the motor cylinder and having a manual operating handle 55. Arranged within this operating handle is a spring-pressed plunger lock 56 for holding the slide valve in its released position. Carried within a recess formed in the inner face of the slide valve is a packing 57 for maintaining sealed, when the slide valve is in its released position, the mouths of passages 58 communicating with the groove 31. Also formed in the slide valve is a vent passage 59 for connecting the passages 58 with the exhaust when this slide valve is in its closed position. When it is desired to effect a hole blowing operation, the operator grasps the handle 55 and slides the valve 53 into its closed position, as shown in Fig. 3, thereby closing the central cylinder exhaust passage 41 and at the same time connecting the passages 58 to atmosphere through the vent port 59. This reduces the pressure within the groove 31, causing the fluid distributing valve to assume the forward position shown in Fig. 3, and as a result causing pressure fluid to flow through the passages 40, 40 to the forward end of the cylinder, moving the hammer piston to its rearmost position shown and holding it there. Pressure fluid flows from these passages 40, 40 to the forward end of the cylinder bore and from there through the grooves 23 in the piston striking bar, through the chuck nut and chuck sleeve and thence through the bore in the drill steel to the bottom of the drill hole to blow away the cuttings from the hole. When the slide valve 53 is slid into its released position shown in Figs. 1 and 2, the motor exhaust passage 41 is opened, while the passages 58 communicating with the groove 31 are closed and maintained sealed by the packing 57. In the modification shown in Figs. 8 and 9, the slide valve 53 is provided with a recess 60 and a vent port 61, and secured within the cylinder is a plug 62 having a bore 63 forming a guide for the stem of a valve 64 arranged in a chamber 65. The chamber 65 is connected with the groove 31 through a passage 66. When the slide valve 53 is in its released position shown in Fig. 8, the valve stem projects upwardly within the recess 60, permitting the valve 64 to seat on the bottom surface of the plug 62, and thereby cutting off comunication of the passage 66 with the bore 63 in the plug. When the slide valve is slid into its closed position shown in Fig. 9, the valve stem is depressed by engagement thereof with the inner surface of the slide valve, thereby moving the valve 64 into its open position and permitting the pressure in groove 31 to vent the exhaust through passage 66, chamber 65, bore 63 and vent port 61. Otherwise this form of the invention is similar to that above described.

In the form of the invention shown in Figs. 11 to 14, inclusive, there is shown a pressure fluid motor comprising a cylinder 70 having a bore 71 containing a reciprocable hammer piston 72 having a forwardly projecting striking bar 73. As the drill steel rotation mechanism operated by the hammer piston and the front drill steel supporting structure is generally the same as that above described, a redescription of this rotation mechanism and front end structure would be a needless repetition. Arranged at the rear end of the cylinder is a rear head plate 74 having a rearwardly projecting sleeve portion 75 fitting a bore 76 formed in a valve chest member 77. Formed in the valve chest member 77 adjacent the rear face of the head plate 74 is an enlarged bore 78 forming a valve chamber in which the improved fluid distributing valve 79 is reciprocable. Communicating with the front end of the valve chamber is an annular groove 80 connected to the rear end of the cylinder bore through passages 81, 81, while communicating with the rear end of the valve chamber bore is an annular groove 82 communicating with the front end of the cylinder bore through passages 83. Communicating with the bore 76 and arranged at the rear of the groove 82 is an enlarged fluid supply groove 84 connected by a passage 85 with a suitable source of fluid supply, and this groove 84 communicates with the valve chamber through relatively narrow longitudinal slots or grooves 86 formed on the exterior periphery of the sleeve portion 75 of the rear head plate 74. The forward ends of these grooves communicate with the extreme forward end of the valve chamber through notches 86'.

Now referring to the improved fluid distributing valve per se, it will be noted that this valve is generally U-shaped in cross section, herein in the form of a sleeve guided on the exterior periphery of the sleeve portion 75, and has end flanges 87 and 88 adapted to seat against the front and rear end walls of the valve chamber. Formed externally on the valve is an annular exhaust groove 89, while the end flanges 87, 88 form annular end chambers 90 and 91 in the opposite faces of the valve. Communicating with the valve chamber between the grooves 80 and 82 is an exhaust passage 92. The ends of the cylinder bore are connectible with exhaust through a piston controlled exhaust passage 93.

The mode of operation of this form of the improved pressure fluid motor will be clearly apparent from the description given. Assuming that the parts are in the position shown in Fig. 11 with the valve in its rearmost position, pressure fluid flows through the supply passages 85 to the annular groove 84, through the longitudinal grooves 86 past the restricted space between the forward end of the valve and the front ends of the grooves, and through the valve chamber and passages 81 to the rear end of the cylinder bore, the pressure fluid acting on the rear pressure area of the piston head to drive the piston forwardly to effect its working stroke. At this time the front end of the cylinder bore is connected to exhaust through the cylinder exhaust passage 93 while the passages 83 and annular groove 82 are connected to atmosphere through the external groove 89 on the valve and exhaust passage 92. As the rear edge of the piston head overruns the exhaust passage 93, there is a sudden drop in pressure within the rear end of the cylinder bore due to the restriction of the flow of fluid past the forward surface of the valve, and as a result, the pressure in the chamber 91 acting on the forward pressure area at the rear face of the valve throws the valve forwardly against the opposing reduced pressure from the position shown in Fig. 11 to the position shown in Fig. 12. When the valve is in the position shown in Fig. 12, the front surface of the flange 87 seats against the rear wall of the valve chamber, cutting off communication of the grooves 86 with the passages 81 and at this time pressure fluid flows through the passage 85, annular groove 84, through the restricted space between the rear end of the valve and the rear wall of the valve chamber and through passages 83 communicating with the front end of the cylinder bore, the pressure fluid acting on the forward face of the piston head to drive the piston rearwardly to effect its retraction stroke. At this time, the rear end of the cylinder bore is connected to exhaust through exhaust passage 93 and passage 81, external groove 89 on the valve and exhaust passage 92. As the forward edge of the piston head overruns the exhaust passage 93, the front end of the cylinder bore is connected to exhaust, and as a result there is a sudden drop in pressure within the passages 83, annular groove 82 and the rear pressure area of the valve flange 88 due to the restriction between the rear end of the valve and the rear wall of the valve chamber, thereby causing the pressure fluid acting on the forward pressure area of the valve in the groove 90 to throw the valve rearwardly against the opposing reduced pressure from the position shown in Fig. 12 to the position shown in Fig. 11. These operations above described are successively repeated during normal operation of the motor to effect rapid reciprocation of the hammer piston.

The means shown in Figs. 11, 12 and 13 for effecting a hole blowing operation comprises a slide valve 95 guided in a guideway 96 on the cylinder and having a manual operating handle 97. Arranged within the handle 97 is a valve 98 held in its closed position by a coiled spring 99, and this valve, when the slide valve 95 is in the position shown in Fig. 12, closes communication of a passage 100 communicating with the groove 90 at the forward end of the valve, with the atmosphere. When it is desired to effect a hole blowing function, the operator slides the slide valve forwardly to a position wherein the exhaust passage 93 is closed, thereby moving the valve to the position shown in Fig. 13 wherein the passage 100 is connected to atmosphere. The venting of the pressure at the forward side of the fluid distributing valve causes the latter to be held by the opposing pressure in the position shown in Fig. 13, and as a result, pressure fluid flows from the passages 83 to the forward end of the cylinder bore, moving the hammer piston into its released position shown and holding it there, pressure fluid flowing from the front end of the cylinder bore through the flutes on the piston striking bar to the hollow drill steel in the manner above described.

While there are in this application specifically described two forms and two modifications which the invention may assume in practice, it will be understood that these forms and modifications of the same are shown for purposes of illustration and that the invention may be further modified and embodied in various other forms without departing from its spirit or the scope of the appended claims.

What I claim as new and desire to secure by Letters Patent is:

1. In combination, in a motor, a cylinder, a piston therein, and fluid distribution means including means providing an annular valve chamber, an annular valve therein, a fluid supply conduit entering through one of the mutually concentric walls of said valve chamber, an exhaust passage opening through the other of said concentric walls, and passage means connecting said valve chamber to the opposite ends of the cylinder including a passage extending from one end of said chamber to one end of said cylinder and mutually distinct passage means connecting the other end of said cylinder with said valve chamber and respectively opening into the latter through an end wall and one of the concentric walls thereof.

2. In combination, in a motor, a cylinder, a piston therein, and fluid distribution means including means providing an annular valve chamber, an annular, internally-grooved valve therein, a fluid supply conduit entering through one of the mutually concentric walls of said valve chamber, an exhaust passage opening through the other of said concentric walls, and passage means connecting said valve chamber to the opposite ends of the cylinder including a passage from one end of said chamber to one end of said cylinder and mutually distinct passage means connecting the other end of said cylinder with said valve chamber and respectively opening into the latter through an end wall and the internal one of the concentric walls thereof.

ELMER G. GARTIN.